US 12,187,169 B2

United States Patent
Kim et al.

(10) Patent No.: US 12,187,169 B2
(45) Date of Patent: Jan. 7, 2025

(54) SEAT FOR VEHICLE

(71) Applicants: Hyundai Motor Company, Seoul (KR); Kia Corporation, Seoul (KR)

(72) Inventors: Mu Young Kim, Gyeonggi-do (KR); Sang Do Park, Gyeonggi-do (KR); Ho Suk Jung, Gyeonggi-do (KR); Jun Young Yun, Gyeonggi-do (KR); Jun Hwan Lee, Seoul (KR); Chan Ho Jung, Gyeonggi-do (KR); Hyeok Seung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 314 days.

(21) Appl. No.: 17/863,620

(22) Filed: Jul. 13, 2022

(65) Prior Publication Data

US 2023/0017048 A1   Jan. 19, 2023

(30) Foreign Application Priority Data

Jul. 14, 2021   (KR) .................. 10-2021-0091975

(51) Int. Cl.
*B60N 2/12*   (2006.01)
(52) U.S. Cl.
CPC ..................... *B60N 2/12* (2013.01)

(58) Field of Classification Search
CPC ... B60N 2/12; B60N 2/20; B60N 2/22; B60N 2/3038; B60N 2/3047; B60N 2/14; B60N 2/38; B60N 2/045; B60N 2/304; B60N 2/3045; B60N 2/305
USPC ..... 296/65.05, 65.09, 65.11, 65.13; 297/321, 297/322, 331, 334, 335, 340
See application file for complete search history.

(56) References Cited

U.S. PATENT DOCUMENTS

| | | | |
|---|---|---|---|
| 6,899,392 B1 * | 5/2005 | Saberan .............. | B60N 2/3022 297/334 |
| 7,040,684 B2 * | 5/2006 | Tame .................. | B60N 2/309 296/65.09 |
| 8,267,457 B2 * | 9/2012 | Yamada .............. | B60N 2/309 297/331 |
| 10,239,427 B2 * | 3/2019 | Keyser ............... | B60N 2/3093 |
| 10,661,683 B2 * | 5/2020 | Becker ............... | B60N 2/3022 |

* cited by examiner

*Primary Examiner* — Amy R Weisberg
*Assistant Examiner* — Denise L. Esquivel
(74) *Attorney, Agent, or Firm* — Fox Rothschild LLP

(57) ABSTRACT

A seat for a vehicle with a new structure integrates a walk-in mechanism, a mechanism for a relaxation posture change function, and a mechanism for a seatback full-flat folding function into one mechanism. The seat selectively performs one function of a walk-in function, a relaxation posture change function, and a seatback full-flat folding function through the one integrated mechanism.

18 Claims, 9 Drawing Sheets

SEAT FOR VEHICLE

CROSS-REFERENCE TO RELATED APPLICATION

This application claims under 35 U.S.C. § 119(a) the benefit of priority to Korean Patent Application No. 10-2021-0091975 filed on Jul. 14, 2021, the entire contents of which are incorporated herein by reference.

BACKGROUND

(a) Technical Field

The present disclosure relates to a seat for a vehicle, and more particularly, to a seat for a vehicle of a new structure mounted with a mechanism for performing a walk-in function, a relaxation posture change function, and a seatback full-flat folding function.

(b) Background Art

In general, seats mounted in the interior of a passenger vehicle are installed as first row seats and second row seats, and for a van or a sport utility vehicle, seat arrangements of three rows or more are installed. In addition, various seat arrangements are provided. Various mechanisms are applied to such seats for vehicles to provide comfortable seating to passengers, to provide convenience during boarding and exiting, or to provide convenience of an expanding space of a luggage room.

As an example, for a vehicle mounted with seats of three rows or more, passengers may directly board the first row and second row seats through opening of a front door and a rear door, respectively, but to secure a passage for boarding and exiting from the third row seats, a separate walk-in mechanism has been applied. For example, a walk-in mechanism of the second row seat for securing the boarding entrance passage for the third row seat may be applied as a mechanism for forward slide movement of a seat cushion as well as forward reclining of a seatback of the second row seat.

As another example, for the second row seat, to satisfy needs for implementation of a comfortable posture of a passenger, a mechanism for a relaxation posture change function that can recline the seatback backward as well as for a tilting operation that can make a front end part of the seat cushion ascend has been applied. As still another example, to secure a load space and an area for a luggage room of a vehicle, a mechanism for a seatback full-flat folding function has been applied, which can fold the seatback of the second row or third row seat, and dive the seat cushion for flattening of the folded seatback together.

However, since the walk-in mechanism, the mechanism for the relaxation posture change function, and the mechanism for the seatback full-flat folding function are separately applied to the second row seat, there are problems in that an excessive number of parts is needed, and thus the cost and assembly labor are increased due to the large number of parts.

SUMMARY OF THE DISCLOSURE

The present disclosure is proposed for solving the above problems, and an object of the present disclosure is to provide a seat for a vehicle having a new structure, which integrates a walk-in mechanism, a mechanism for a relaxation posture change function, and a mechanism for a seatback full-flat folding function into one mechanism, and selectively performs one function of a walk-in function, a relaxation posture change function, and a seatback folding function through the one integrated mechanism.

The objects of the present disclosure are not limited to those as described above, and other unmentioned objects of the present disclosure may be clearly understood from the following description by those of ordinary skill in the art to which the present disclosure pertains (hereinafter, "ordinary technicians").

In an embodiment of the present disclosure, a seat for a vehicle may include: a fixed rail mounted on a floor panel; a seat cushion frame having both side parts on each of which a hinge bracket is mounted; a slider mounted on a front side of the fixed rail fixedly or movably back and forth; a front link having a front end part connected to the slider through a first hinge and a rear end part connected to the hinge bracket through a second hinge; a recliner base frame mounted on a rear side of the fixed rail movably back and forth; a rear link having a front end part integrally formed on the hinge bracket and a rear end part connected to the recliner base frame through a third hinge; and a seatback frame connected to an upper end part of the recliner base frame through a recliner.

According to an embodiment of the present disclosure, a first moving rail may be mounted on the front side of the fixed rail fixedly or movably back and forth, and the slider is mounted on the first moving rail. A second moving rail may be mounted on the rear side of the fixed rail movably back and forth, and the recliner base frame may be mounted on the second moving rail.

When the recliner base frame is moved forward by a distance of a maximum set range along the fixed rail in a state where the slider is fixed to the fixed rail, the rear link may be rotated to stand up rearward around the third hinge, and the front link may be rotated to stand up forward around the first hinge and the second hinge at the same time, to implement a walk-in function for rotating the seat cushion frame rearward to stand up. When a seatback frame is reclined forward around the recliner when the seat cushion frame is rotated rearward to stand up, a walk-in function for securing a wider passage space for boarding and alighting may be implemented.

According to an embodiment of the present disclosure, when the recliner base frame is moved forward by a distance of a minimum set range along the fixed rail in a state where the slider is fixed to the fixed rail, the rear link may be rotated to be tilted rearward around the third hinge, and the front link may be rotated to be tilted forward around the first hinge and the second hinge at the same time, to perform a tilting operation to cause a front end part of the seat cushion frame ascend, and to implement a relaxation posture change function by a reclining operation for reclining the seatback frame rearward around the recliner.

When the recliner base frame is moved rearward for a set distance along the fixed rail in a state where the slider is fixed to the fixed rail, the rear link is rotated downward around the third hinge, and the front link is rotated downward around the first hinge and the second hinge at the same time, to perform a dive operation for making a front end part of the seat cushion frame descend, and a seatback full-flat folding function is implemented by a folding operation for folding the seatback frame forward around the recliner. When the recliner base frame and the slider are moved forward or rearward along the fixed rail in a state where the slider is movably mounted on the fixed rail, back and forth positions of a whole seat are adjusted.

In another embodiment of the present disclosure, a seat for a vehicle may include: a fixed rail mounted on a floor panel; a seat cushion frame having both side parts on each of which a hinge bracket is mounted; a moving rail mounted movably back and forth on the fixed rail; a recliner base frame connected to a lower end part of a seatback frame by a recliner; a guide frame extending from a front end part of the recliner base frame to be mounted on the moving rail, and provided with a structure in which a front guide hole and a rear guide hole are penetratingly formed; a front link having a front end part on which a first guide pin being inserted into the front guide hole of the guide frame is formed and a rear end part connected to the hinge bracket through a second hinge; a rear link having a front end part integrally formed on the hinge bracket and a rear end part on which a second guide pin being inserted into the rear guide hole of the guide frame is formed; and a middle link having a front end part connected to a boundary surface between the front guide hole and the rear guide hole of the guide frame through a fourth hinge and a rear end part connected to the front end part of the rear link through a fifth hinge.

According to another embodiment of the present disclosure, when the first guide pin of the front link is moved rearward for a maximum set distance along the front guide hole of the guide frame, and the second guide pin of the rear link is moved forward for the maximum set distance along the rear guide hole at the same time, the middle link may be rotated to stand up forward around the fourth hinge and the fifth hinge, to implement a walk-in function for reclining a seatback frame forward around the recliner after making the seat cushion frame stand up by rotating a front end part of the seat cushion frame rearward and simultaneously moving a rear end part of the seat cushion frame forward.

When the first guide pin of the front link is moved rearward for a minimum set distance along the front guide hole of the guide frame, and the second guide pin of the rear link is moved forward for the minimum set distance along the rear guide hole at the same time, the middle link may be rotated to be tilted forward around the fourth hinge and the fifth hinge, to perform a tilting operation for making a front end part of the seat cushion frame ascend and pulling a rear end part of the seat cushion frame forward at the same time, and implement a relaxation posture change function by a reclining operation for reclining the seatback frame rearward around the recliner.

When the first guide pin of the front link is moved to a front-most side of the front guide hole of the guide frame, and the second guide pin of the rear link is moved to a rear-most side of the rear guide hole at the same time, the middle link may be rotated to be laid down around the fourth hinge and the fifth hinge, to perform a dive operation for making a front end part of the seat cushion frame descend, and implement a seatback full-flat folding function by a folding operation for folding the seatback frame forward around the recliner.

The present disclosure provides the following effects through the above-described solving means.

First, the walk-in function of the second row seats, the relaxation posture change function, and the seatback full-flat folding function may be selectively performed by integrating the walk-in mechanism, the mechanism for the relaxation posture change function, and the mechanism for the seatback full-flat folding function into one mechanism and applying the one integrated mechanism to the second row seats.

Second, since the walk-in mechanism, the mechanism for the relaxation posture change function, and the mechanism for the seatback full-flat folding function may be integrated into one mechanism, reduction of the number of parts, the cost, and the weight of the seat can be sought.

Other aspects and preferred embodiments of the present disclosure are discussed infra.

It is understood that the term "vehicle" or "vehicular" or other similar term as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinafter by way of illustration only, and thus are not limitative of the present disclosure, and wherein.

Figure 1:
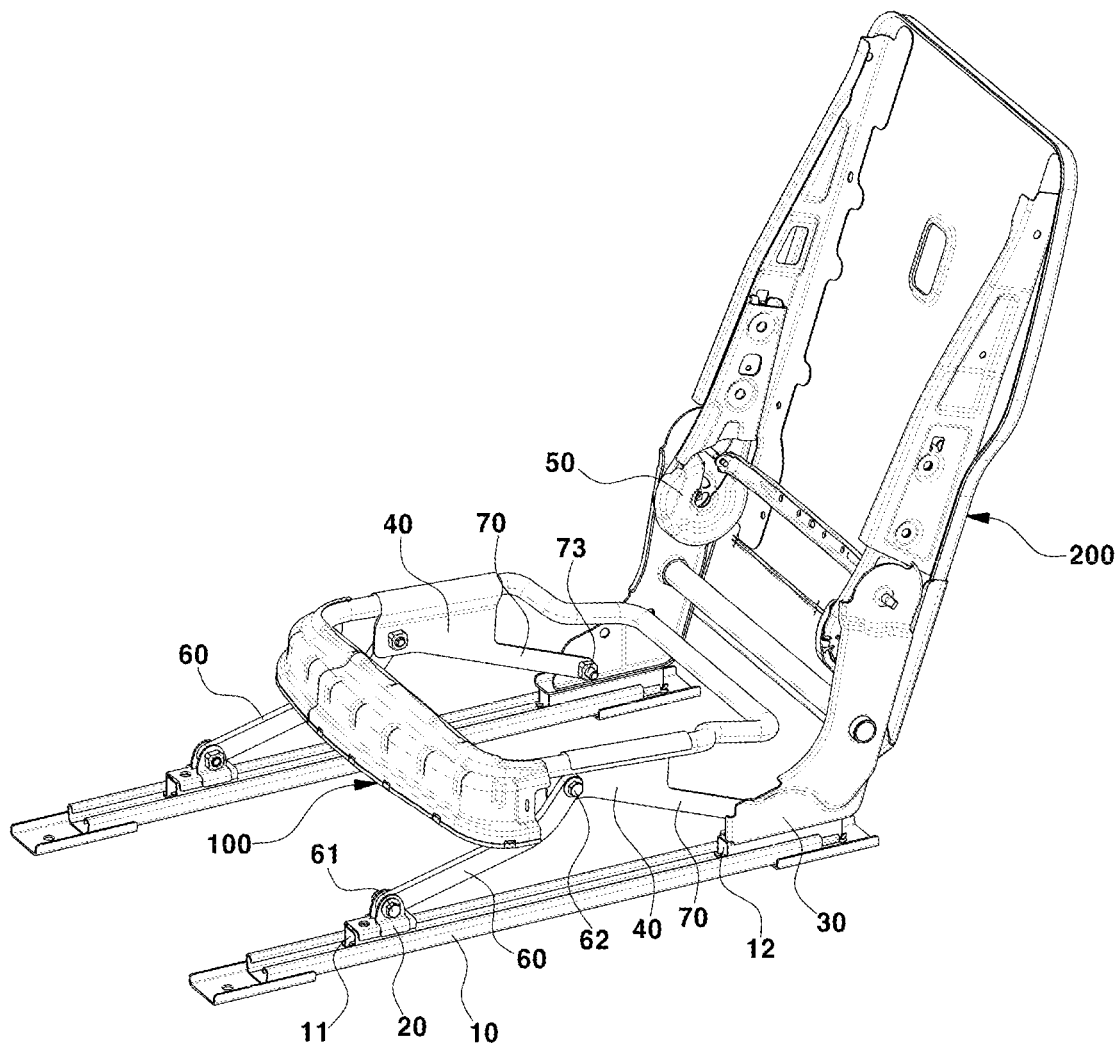
FIGS. 1 and 2 are perspective views illustrating the appearance of a seat for a vehicle according to an embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

First Embodiment

Figure 2:
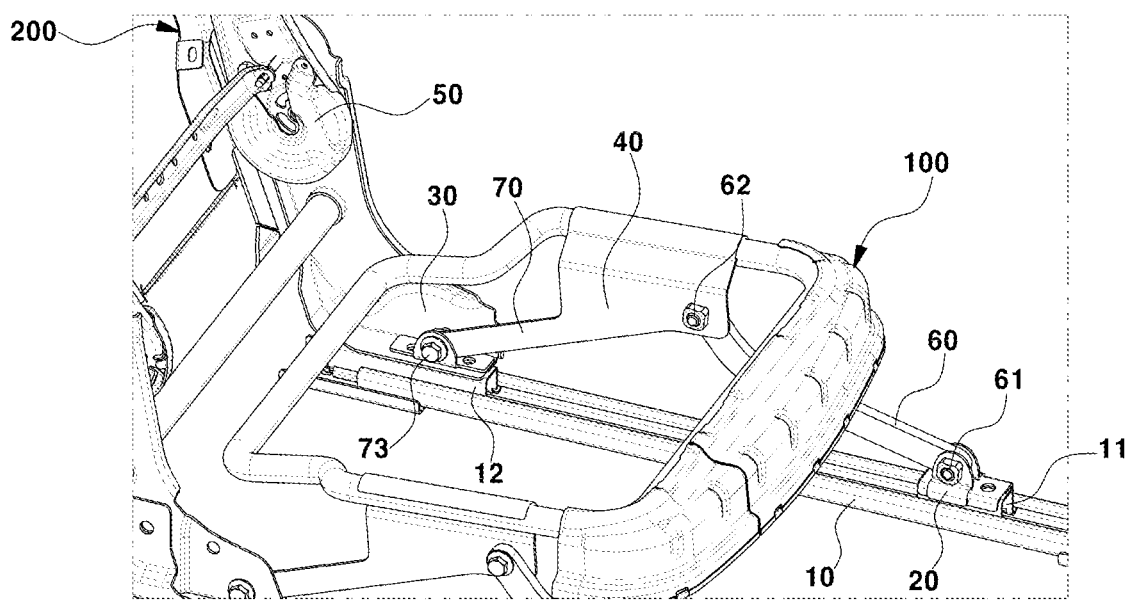

Accompanying FIGS. 1 and 2 are perspective views illustrating the appearance of a seat for a vehicle according to an embodiment of the present disclosure, and in the drawings, drawing reference numeral 10 denotes a fixed rail.

The fixed rail 10 may be mounted on a floor panel that mostly configures a bottom surface of a vehicle. A slider 20 may be mounted on a front side of the fixed rail 10 fixedly or movably back and forth, and a recliner base frame 30 may be mounted on a rear side of the fixed rail 10 movably back and forth. A first moving rail 11 may be mounted on the front side of the fixed rail 10 fixedly or movably back and forth, and the slider 20 may be fixedly mounted on the first moving rail 11. Further, a second moving rail 12 may be mounted on a rear side of the fixed rail 10 movably back and forth, and the recliner base frame 30 may be fixedly mounted on the second moving rail 12.

Meanwhile, a hinge bracket 40 may be integrally mounted on both side parts of a seat cushion frame 100 by welding. Further, both lower end parts of a seatback frame 200 may be connected to an upper end part of the recliner base frame 30 by a recliner 50. Since the recliner 50 has a well-known configuration for reclining a seatback forward or rearward, the detailed explanation thereof will be omitted. In particular, a front link 60 may be connected between the slider 20 and the hinge bracket 40, and a rear link 70 integrally formed on a rear part of the hinge bracket 40 extends rearward, and may be connected to the recliner base frame 30.

As illustrated in FIG. 1, a front end part of the front link 60 may be rotatably connected to the slider 20 by a first hinge 61, and a rear end part of the front link 60 may be rotatably connected to a front end part of the hinge bracket 40 by a second hinge 62. As illustrated in FIG. 2, a front end part of the rear link 70 may be integrally formed with the hinge bracket 40, and a rear end part of the rear link 70 may be rotatably connected to an inner surface of the recliner base frame 30 by a third hinge 73.

Meanwhile, although not illustrated, a motor having a screw as a shaft may be connected to the slider 20 as a driver for back and forth movement of the slider 20, and although not illustrated, a motor having a screw as a shaft may be connected even to the recliner base frame 30 as a driver for back and forth movement of the recliner base frame 30. In particular, an operation example of a seat for a vehicle according to an embodiment of the present disclosure will be described as follows.

Walk-In Function

Figure 3:
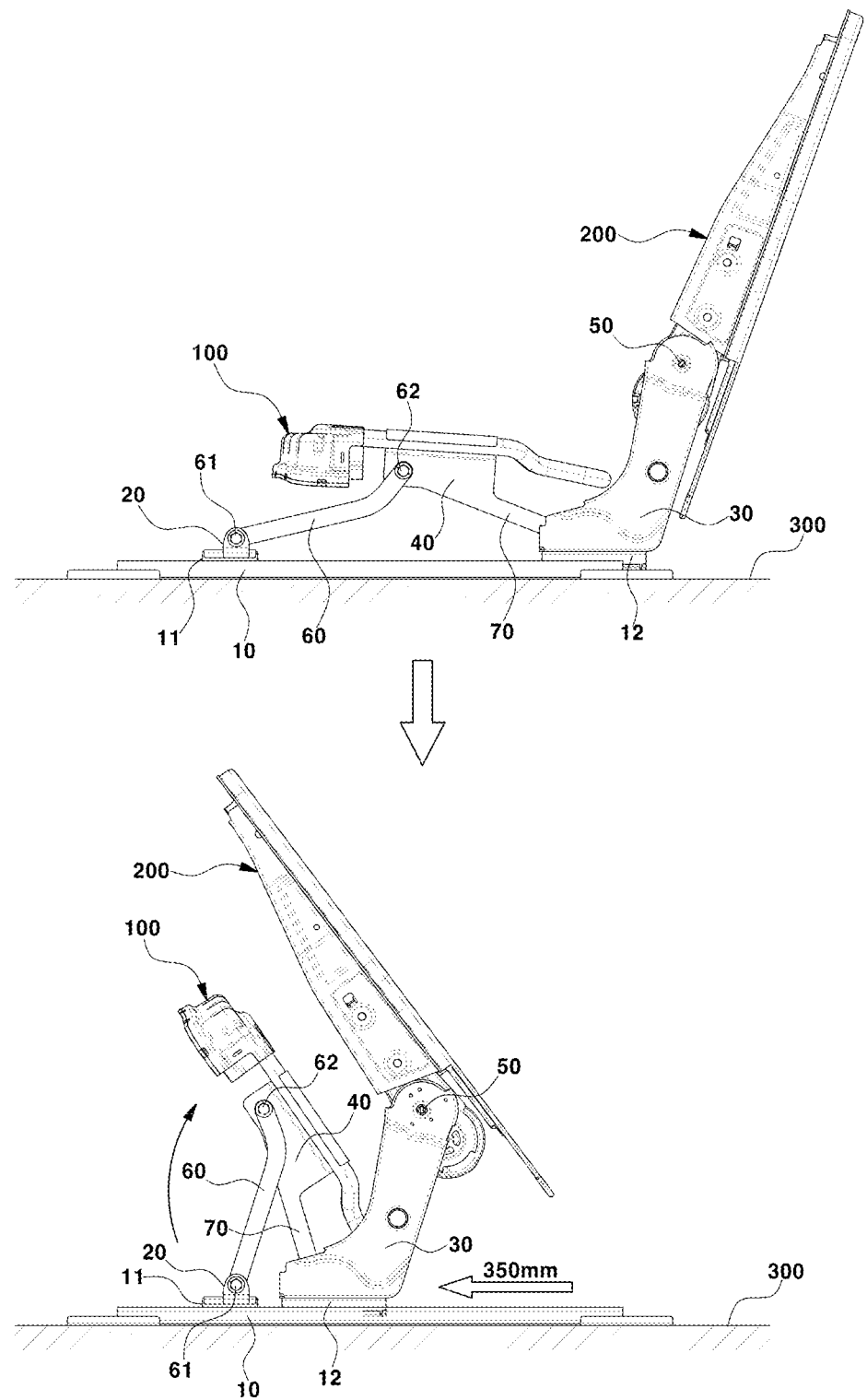
FIG. 3 is a side view illustrating implementation of a walk-in function of a seat for a vehicle according to an embodiment of the present disclosure.

Accompanying FIG. 3 is a side view illustrating implementation of a walk-in function of a seat for a vehicle according to an embodiment of the present disclosure. As illustrated in FIG. 3, to implement the walk-in function, a moving rail 12 on which the recliner base frame 30 is mounted may be moved forward by a distance of a maximum set range along the fixed rail 10 in a state where the slider 20 is fixed to the fixed rail 10 mounted on the floor panel 300 without being moved.

For example, if the motor connected to the slider 20 is not driven, the slider 20 may be fixed to the fixed rail 10 without being moved, while if the motor connected to the recliner base frame 30 is driven, the recliner base frame 30 and the second moving rail 12 mounted with the recliner base frame 30 may be moved forward by the distance of the maximum set range along the fixed rail 10, and as a result, only the seatback frame 200 and the recliner base frame 30 constituting a rear side portion of the seat may be moved forward by the distance of the maximum set range.

Preferably, the distance of the maximum set range, in which the recliner base frame 30 can move forward along the fixed rail 10, may be set to about 315 mm to 350 mm that is greater than the forward movement distance according to the existing walk-in mechanism, being normally set to 315 mm. In particular, when the recliner base frame 30 is moved forward by the distance of the maximum set range along the fixed rail 10, the seatback frame 200 connected to the recliner base frame 30 is also moved forward.

Thereafter, when the recliner base frame 30 is moved forward by the distance of the maximum set range along the fixed rail 10, as illustrated in FIG. 3, the rear link 70 may be rotated to stand up rearward around the third hinge 73, and the front link 60 may be rotated to stand up forward around the first hinge 61 and the second hinge 62 at the same time, so that the seat cushion frame 100 having the hinge bracket 40 that is connected to a rear end part of the front link 60 and a front end part of the rear link 70 is also rotated to stand up rearward.

As described above, since the seatback frame 200 is moved forward together with the recliner base frame 30, and the seat cushion frame 100 is rotated to stand up rearward, the walk-in function may be implemented to secure a passage space for boarding and alighting (exiting) from the third row seat on the back of the second row seat. Particularly, by reclining the seatback frame 200 forward at about 40 degrees around the recliner 50, a wider passage space for boarding and alighting for the third row seat on the back of the second row seat may be secured.

Relaxation Posture Change Function

Figure 4:
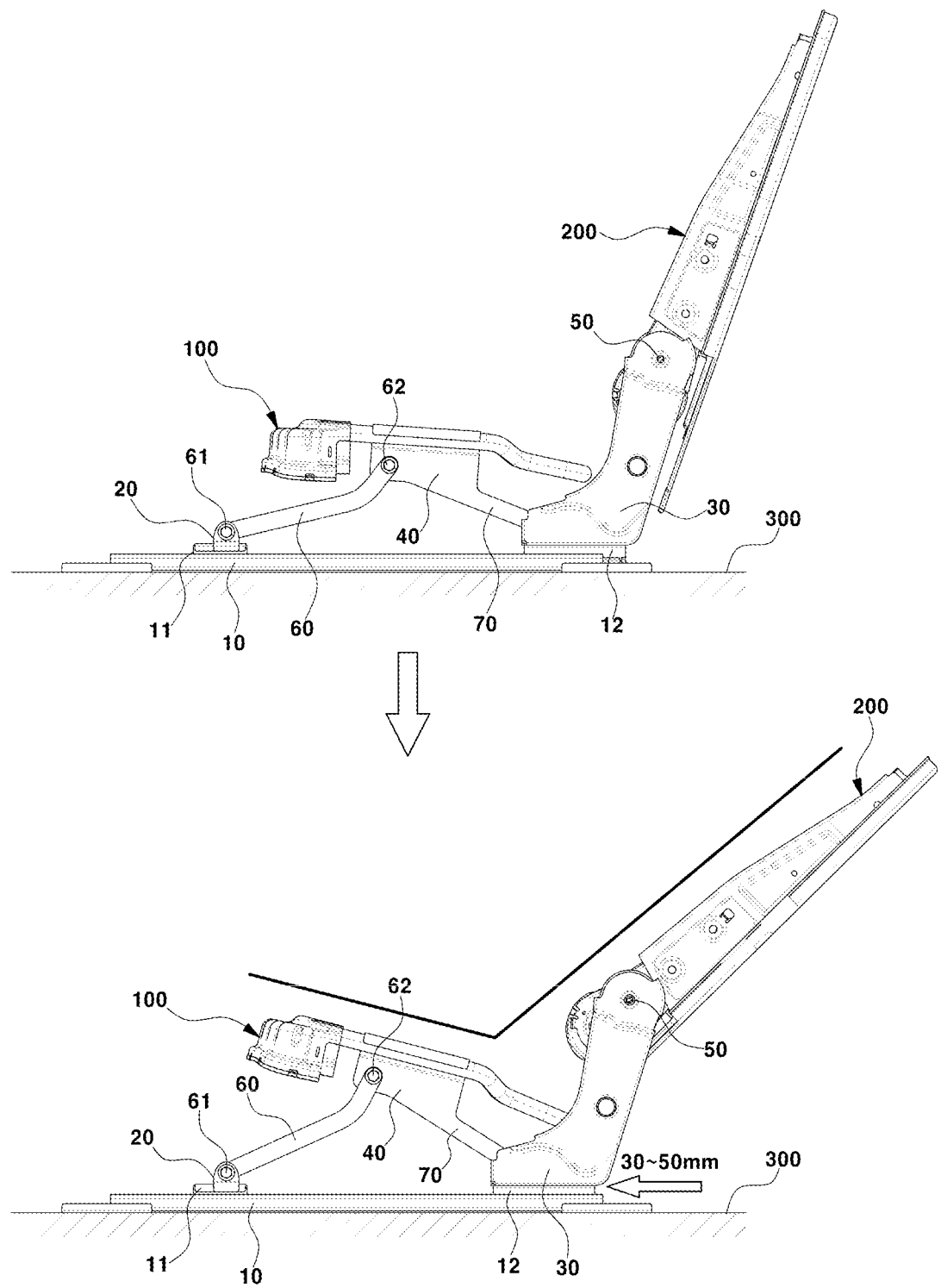
FIG. 4 is a side view illustrating implementation of a relaxation posture change function of a seat for a vehicle according to an embodiment of the present disclosure.

Accompanying FIG. 4 is a side view illustrating implementation of a relaxation posture change function of a seat for a vehicle according to an embodiment of the present disclosure. As illustrated in FIG. 4, to implement the relaxation posture change function, a moving rail 12 on which the recliner base frame 30 is mounted may be moved forward by a distance of a minimum set range along the fixed rail 10 in a state where the slider 20 is fixed to the fixed rail 10 mounted on the floor panel 300 without being moved.

For example, if the motor connected to the slider 20 is not driven, the slider 20 may be fixed to the fixed rail 10 without being moved, while if the motor connected to the recliner base frame 30 is driven, the recliner base frame 30 and the second moving rail 12 mounted with the recliner base frame 30 may be moved forward by the distance of the minimum set range along the fixed rail 10, and as a result, only the seatback frame 200 and the recliner base frame 30 constituting a rear side portion of the seat may be moved forward by the distance of the minimum set range.

Preferably, the distance of the minimum set range, in which the recliner base frame 30 can move forward along the fixed rail 10, may be set to about 30 mm to 50 mm. In this case, when the recliner base frame 30 is moved forward by the distance of the minimum set range along the fixed rail 10, the seatback frame 200 connected to the recliner base frame 30 is also moved forward.

Thereafter, when the recliner base frame 30 is moved forward by the distance of the minimum set range along the fixed rail 10, as illustrated in FIG. 4, the rear link 70 may be rotated to be tilted rearward around the third hinge 73, and the front link 60 may be rotated to be tilted forward around the first hinge 61 and the second hinge 62 at the same time, to perform a tilting operation to make the front end part of the seat cushion frame 100 ascend. Along with this, by reclining the seatback frame 200 rearward at about 30 degrees around the recliner 50, the relaxation posture change function for passenger's comfortable seating may be implemented.

Seatback Full-Flat Folding Function

Figure 5:
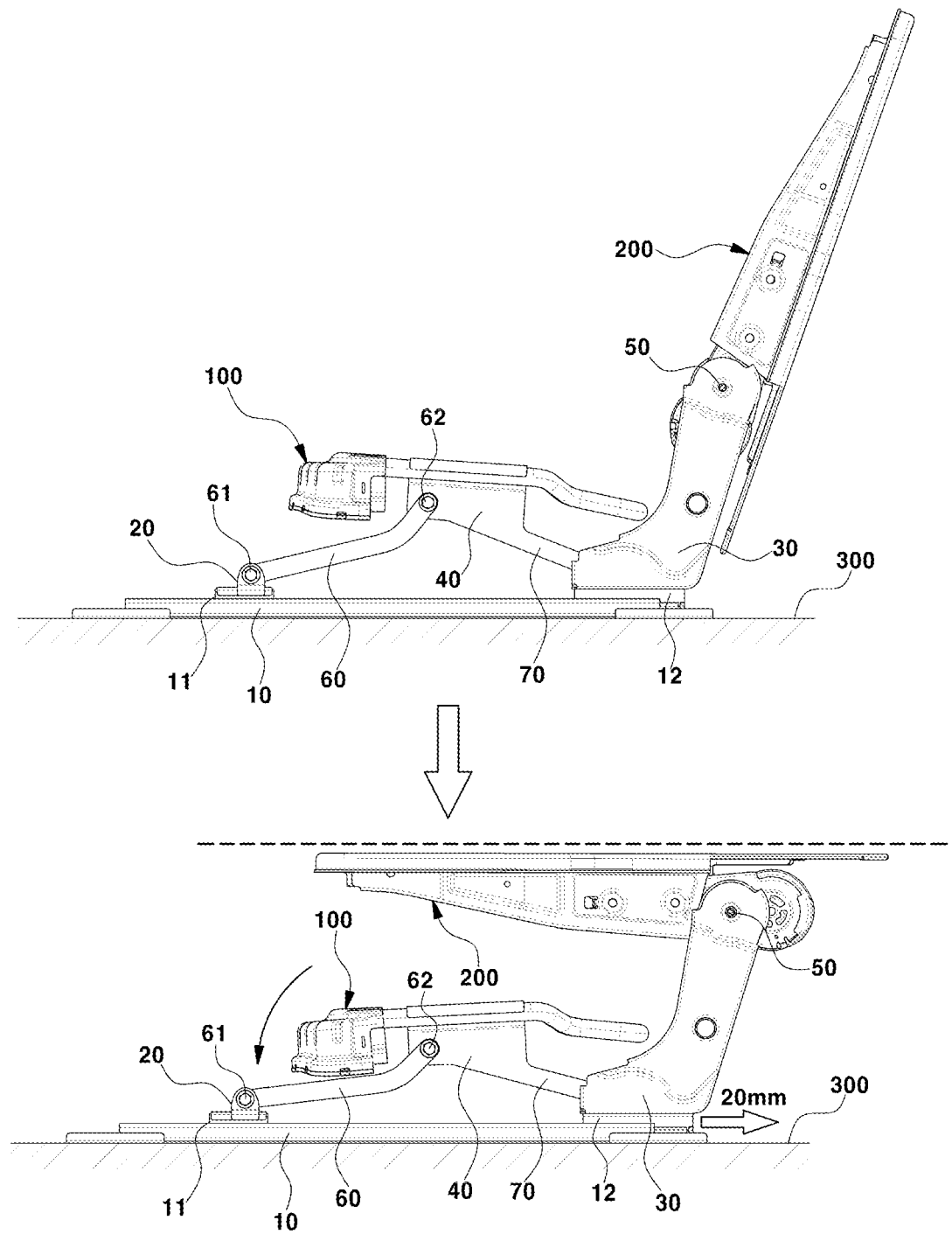
FIG. 5 is a side view illustrating implementation of a seatback full-flat folding function of a seat for a vehicle according to an embodiment of the present disclosure.

Accompanying FIG. 5 is a side view illustrating implementation of a seatback full-flat folding function of a seat for a vehicle according to an embodiment of the present disclosure. As illustrated in FIG. 5, to implement the seatback full-flat folding function, a moving rail 12 on which the recliner base frame 30 is mounted may be moved rearward for a set distance (e.g., about 20 mm) along the fixed rail 10 in a state where the slider 20 is fixed to the fixed rail 10 mounted on the floor panel 300 without being moved.

For example, if the motor connected to the slider 20 is not driven, the slider 20 may be fixed to the fixed rail 10 without being moved, while if the motor connected to the recliner base frame 30 is driven, the recliner base frame 30 and the second moving rail 12 mounted with the recliner base frame 30 may be moved rearward for the set distance along the fixed rail 10, and as a result, only the seatback frame 200 and the recliner base frame 30 constituting a rear side portion of the seat may be moved rearward for the set distance.

Thereafter, when the recliner base frame 30 is moved rearward for the set distance along the fixed rail 10, the rear link 70 may be rotated downward around the third hinge 73, and the front link 60 may be rotated downward around the first hinge 61 and the second hinge 62 at the same time, to perform a dive operation to make the front end part of the seat cushion frame 100 descend.

Along with this, by folding the seatback frame 200 forward around the recliner 50, a dive operation to make the front end part of the seat cushion frame 100 descend to avoid interference with the seatback may be performed, and thus the seatback full-flat folding function to arrange the seatback frame 200 in a horizontal state after being folded may be implemented.

Figure 6:
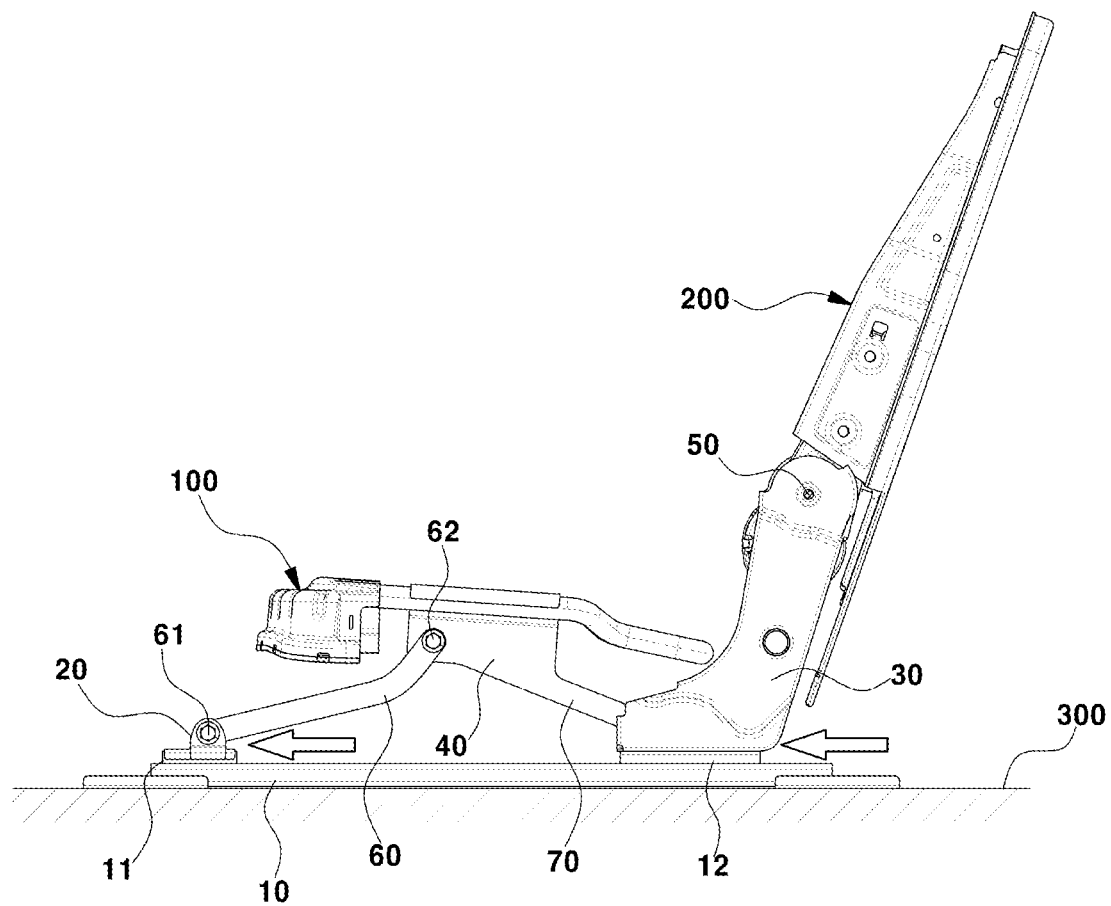
FIG. 6 is a side view illustrating a back and forth position adjustment operation of a seat for a vehicle according to an embodiment of the present disclosure.

Meanwhile, a back and forth position adjustment of the seat according to the present disclosure is possible. Accompanying FIG. 6 is a side view illustrating implementation of a back and forth position adjustment operation of a seat for a vehicle according to an embodiment of the present disclosure. As illustrated in FIG. 6, for the back and forth position adjustment of the seat, the slider 20 and the recliner base frame 30 are together moved forward or backward along the fixed rail 10.

For example, if the motor connected to the slider 20 is driven, the slider 20 may be moved along the fixed rail 10, while if the motor connected to the recliner base frame 30 is driven, the recliner base frame 30 may also be moved along the fixed rail 10. Accordingly, by moving the slider 20 and the recliner base frame 30 forward and backward for a desired distance along the fixed rail 10, the back and forth positions of the whole seat may be easily adjusted to desired positions.

As described above, according to the first embodiment of the present disclosure, the walk-in function of the second row seats, the relaxation posture change function, and the seatback full-flat folding function may be selectively performed by integrating the walk-in mechanism, the mechanism for the relaxation posture change function, and the mechanism for the seatback full-flat folding function into one mechanism and applying the one integrated mechanism to the second row seats.

Second Embodiment

Another embodiment of the present disclosure is to provide a mechanism for resolving the occurrence of an interference phenomenon in that the rear end part of the seat cushion comes in contact with the lower end part of the front surface of the seatback when the walk-in function or the relaxation posture change function of the vehicle seat according to the first embodiment as described above is performed.

Figure 7:
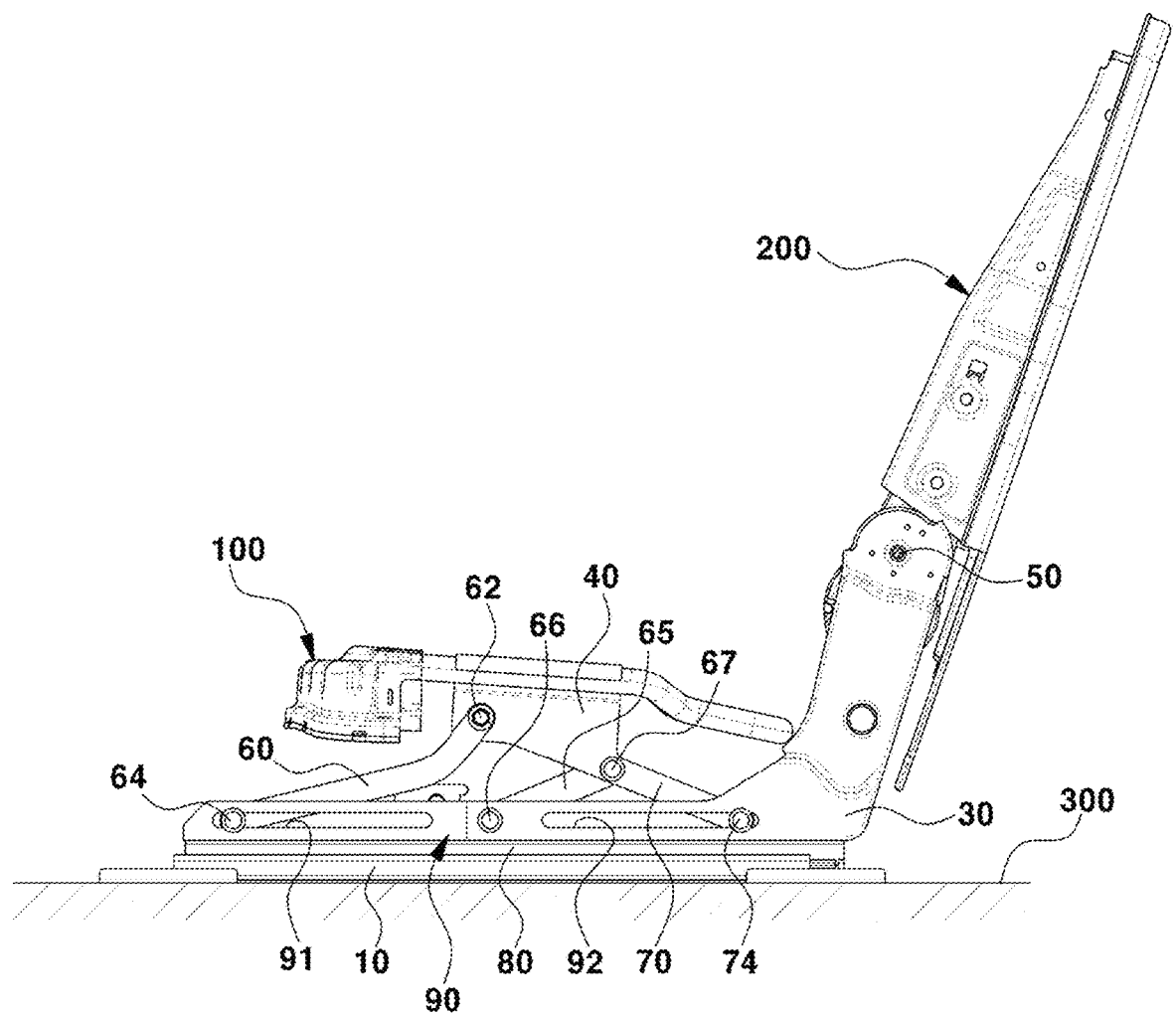
FIG. 7 is a side view illustrating a seat for a vehicle according to another embodiment of the present disclosure.

Accompanying FIG. 7 is a side view illustrating a seat for a vehicle according to another embodiment of the present disclosure. As illustrated in FIG. 7, a fixed rail 10 is fixedly mounted on a floor panel 300 configuring a bottom surface of a vehicle, and one moving rail 80 is mounted on the fixed rail movably back and forth.

Further, a hinge bracket 40 may be integrally mounted on both side parts of a seat cushion frame 100 by welding, and a recliner base frame 30 may be connected to both lower end parts of a seatback frame 200 by a recliner 50. Since the recliner 50 has a well-known configuration for reclining a seatback forward or rearward, the detailed explanation thereof will be omitted. In particular, a guide frame 90 mounted on the moving rail 80 may be integrally formed to extend from a front end part of the recliner base frame 30, and a front guide hole 91 and a rear guide hole 92 may be penetratingly formed in front and on the back of the guide frame 90.

Further, a front link 60 may be connected between the front guide hole 91 of the guide frame 90 and the hinge bracket 40, and a rear link 70 integrally formed on a rear part of the hinge bracket 40 may be connected to the rear guide hole 92 of the guide frame 90. Accordingly, a first guide pin 64, which is inserted into the front guide hole 91 of the guide frame 90 movably back and forth, may be formed on a front end part of the front link 60, and a rear end part of the front link 60 may be rotatably connected to the hinge bracket 40 by a second hinge 62.

Further, a front end part of the rear link 70 may be integrally formed on the hinge bracket 40, and a second guide pin 74, which is inserted into the rear guide hole 92 of the guide frame 90 movably back and forth, may be formed on a rear end part of the rear link 70. In particular, to guide and support rotation and back and forth movement direction of the hinge bracket 40 and the rear link 70, a middle link 65 may be rotatably connected between the guide frame 90 and the front end part of the rear link 70. In other words, a front end part of the middle link 65 may be rotatably connected to a boundary surface between the front guide hole 91 and the rear guide hole 92 of the guide frame 90 through a fourth hinge 66, and a rear end part of the middle link 65 may be rotatably connected to the front end part of the rear link 70 through a fifth hinge 67.

Meanwhile, although not illustrated, a motor having a screw as a shaft may be connected to the first guide pin 64 as a driver for back and forth movement of the first guide pin 64 along the front guide hole 91, and although not illustrated, a motor having a screw as a shaft may be connected even to the second guide pin 74 as a driving means for back and forth movement of the second guide pin 74 along the rear guide hole 92. In particular, an operation example of a seat for a vehicle according to another embodiment of the present disclosure will be described as follows.

Walk-In Function

Figure 8:
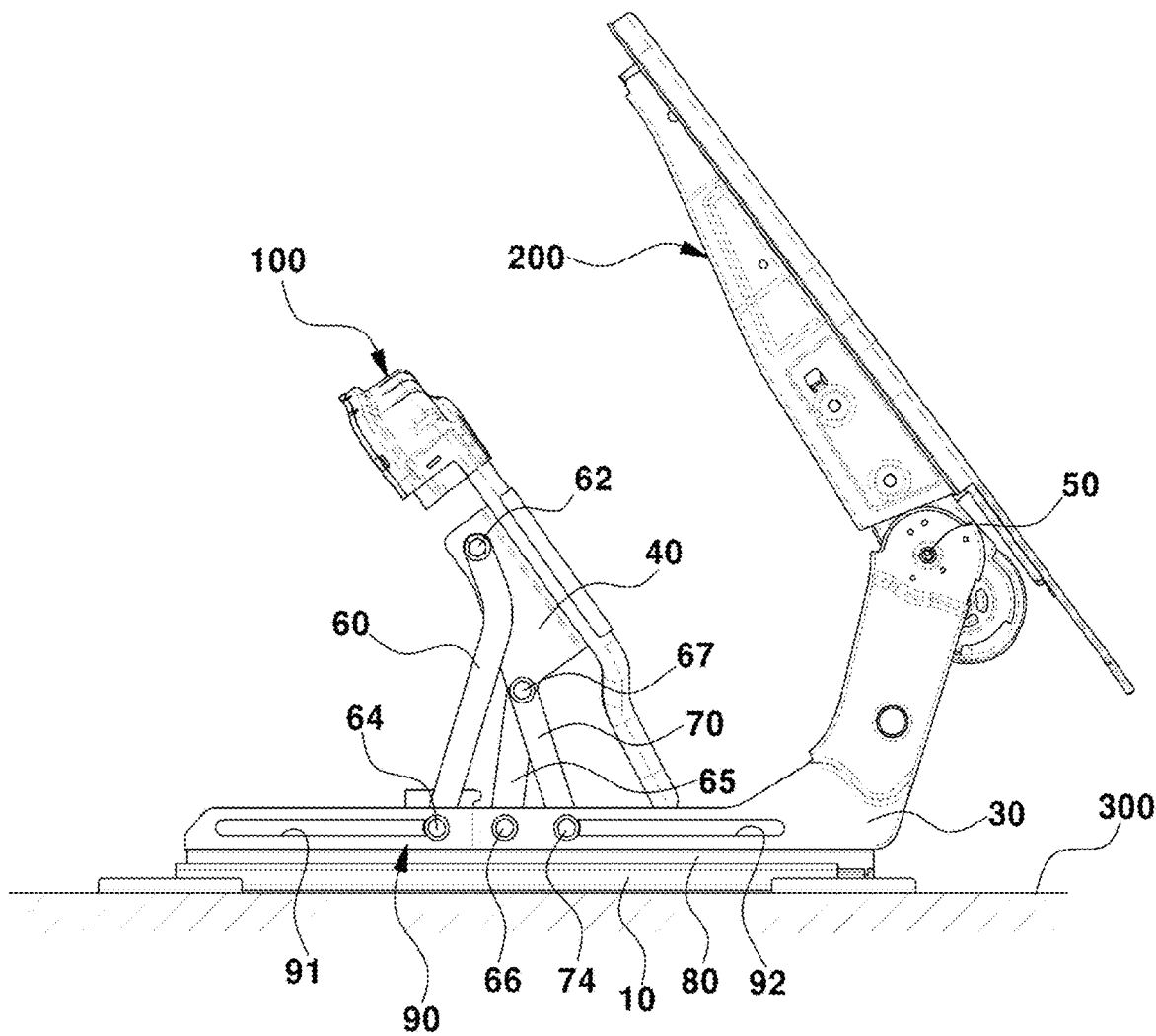
FIG. 8 is a side view illustrating implementation of a walk-in function of a seat for a vehicle according to another embodiment of the present disclosure.

Accompanying FIG. 8 is a side view illustrating implementation of a walk-in function of a seat for a vehicle according to another embodiment of the present disclosure. As illustrated in FIG. 8, to implement the walk-in function, the first guide pin 64 of the front link 60 may be moved rearward for a maximum set distance from a reference position along the front guide hole 91 of the guide frame 90, and the second guide pin 74 of the rear link 70 may be moved forward for a maximum set distance from the reference position along the rear guide hole 92 at the same time. For example, if the motor connected to the first guide pin 64 is driven, the first guide pin 64 may be moved rearward for the maximum set distance along the front guide hole 91, while if the motor connected to the second guide pin 74 is driven, the second guide pin 74 may be moved forward for the maximum set distance along the rear guide hole 92.

Thereafter, when the first guide pin 64 of the front link 60 is moved rearward for the maximum set distance along the front guide hole 91, the front link 60 may be moved rearward and simultaneously in a maximum standing state, and at the same time, when the second guide pin 74 of the rear link 70 is moved forward for the maximum set distance along the rear guide hole 92, the rear link 70 may be moved forward and maximally stands up at the same time. In particular, the middle link 65 may be rotated forward around the fourth hinge 66 and the fifth hinge 67 to maximally stand up, and support the hinge bracket 40 and the rear link 70.

Accordingly, when the front link 60 is moved rearward and maximally stands up at the same time, the front end part of the seat cushion frame 100 may be pushed up and may be rotated rearward, and at the same time, when the rear link 70 is moved forward and maximally stands up at the same time, the rear end part of the seat cushion frame 100 may be pulled forward, so that an interference phenomenon in that the rear end part of the seat cushion comes in contact with the lower end part of the front surface of the seatback may be prevented when the walk-in function is performed.

Then, after the front end part of the seat cushion frame 100 is rotated rearward and the rear end part thereof is moved forward to make the seat cushion frame 100 stand up at the same time, the walk-in function for securing the passage space for boarding and alighting (exiting) for the third row seat on the back of the second row seat may be implemented by reclining the seatback frame 200 forward around the recliner 50. In particular, if the moving rail 80 is moved forward along the fixed rail 10, the whole seat may be moved forward, and thus a wider passage space for boarding and alighting for the third row seat on the back of the second row seat may be secured.

Relaxation Posture Change Function

Figure 9:
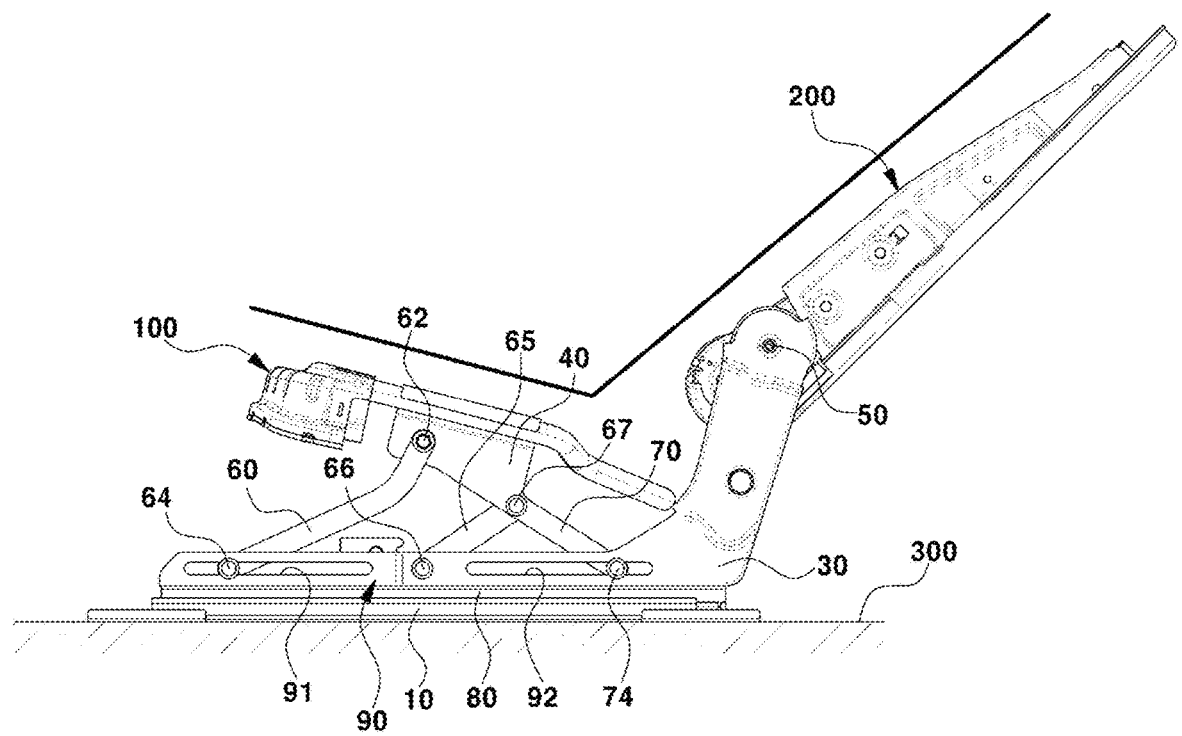
FIG. 9 is a side view illustrating implementation of a relaxation posture change function of a seat for a vehicle according to another embodiment of the present disclosure.

Accompanying FIG. 9 is a side view illustrating implementation of a relaxation posture change function of a seat for a vehicle according to another embodiment of the present disclosure. As illustrated in FIG. 9, to implement the relaxation posture change function, the first guide pin 64 of the front link 60 may be moved rearward for the minimum set distance from a reference position along the front guide hole 91 of the guide frame 90, and at the same time, the second guide pin 74 of the rear link 70 may be moved forward for the maximum set distance from the reference position along the rear guide hole 92. For example, if the motor connected to the first guide pin 64 is driven, the first guide pin 64 may be moved rearward for the minimum set distance along the front guide hole 91, and if the motor connected to the second guide pin 74 is driven, the second guide pin 74 may be moved forward for the minimum set distance along the rear guide hole 92.

Thereafter, when the first guide pin 64 of the front link 60 is moved rearward for the minimum set distance along the front guide hole 91, the front link 60 may also be moved rearward for the minimum set distance to push up the front end part of the seat cushion frame 100, and at the same time, when the second guide pin 74 of the rear link 70 is moved forward for the minimum set distance along the rear guide hole 92, the rear link 70 may also be moved forward for the minimum set distance to pull the rear end part of the seat cushion frame 100 forward.

In particular, the middle link 65 may be rotated to be tilted forward around the fourth hinge 66 and the fifth hinge 67, and support the hinge bracket 40 and the rear link 70. Accordingly, since the front end part of the seat cushion frame 100 is pushed up and the rear end part of the seat cushion frame 100 is pulled forward at the same time, the interference phenomenon in which the rear end part of the seat cushion comes in contact with the lower end part of the front surface of the seatback may be prevented when the relaxation posture change function is performed.

As described above, the tilting operation for making the front end part of the seat cushion frame 100 ascend and making the rear end part thereof be pulled forward at the same time can be performed, and the relaxation posture change function may be implemented by the reclining operation for reclining the seatback frame 200 rearward around the recliner 50.

Seatback Full-Flat Folding Function

Figure 10:
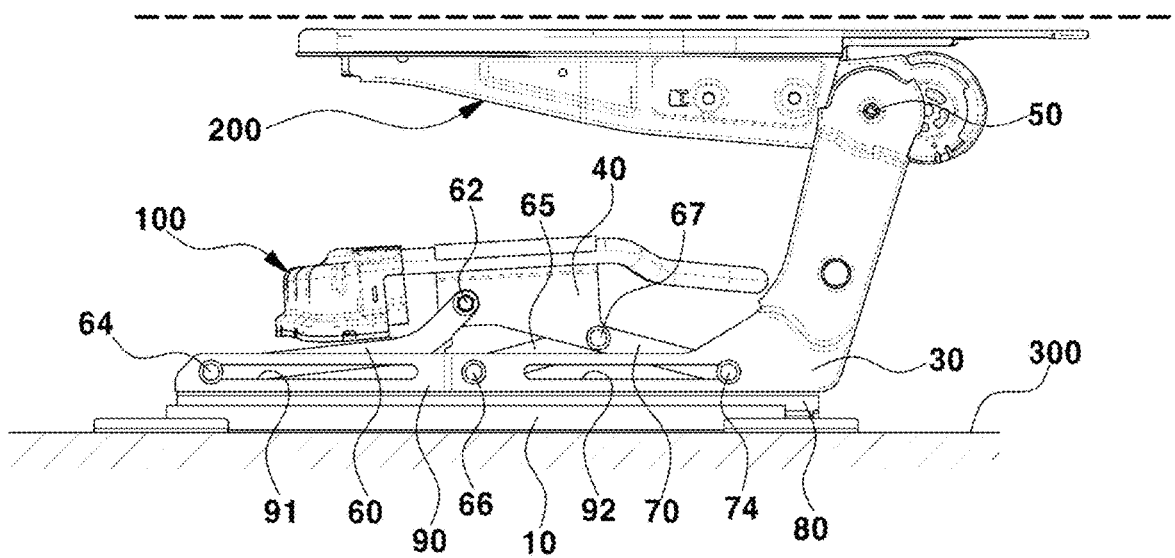
FIG. 10 is a side view illustrating implementation of a seatback full-flat folding function of a seat for a vehicle according to another embodiment of the present disclosure.

Accompanying FIG. 10 is a side view illustrating implementation of a seatback full-flat folding function of a seat for a vehicle according to another embodiment of the present disclosure. As illustrated in FIG. 10, the first guide pin 64 of the front link 60 may be moved to a front-most side of the front guide hole 91 of the guide frame 90, and the second guide pin 74 of the rear link 70 may be moved to a rear-most side of the rear guide hole 92 at the same time.

For example, if the motor connected to the first guide pin 64 is driven, the first guide pin 64 may be moved to the front-most side of the front guide hole 91, and if the motor connected to the second guide pin 74 is driven, the second guide pin 74 may be moved to the rear-most side of the rear guide hole 92. Thereafter, the front link 60 and the rear link 70 may be rotated to be laid downward, and the middle link 65 may also be rotated to be laid down around the fourth hinge 66 and the fifth hinge 67, to perform a dive operation for making the front end part of the seat cushion frame 100 descend.

Then, if the seatback frame 200 is folded forward around the recliner 50, the front end part of the seat cushion frame 100 descends to be in a dive operation state to avoid the interference with the seatback, and thus the seatback full-flat folding function for arranging the seatback frame 200 in a horizontal state after being folded may be implemented.

Although embodiments of the present disclosure have been described in detail, the scope of the present disclosure is not limited thereto, and various modifications and improvements by those skilled in the art using the basic concept of the present disclosure being defined in the appended claims are also included in the scope of the present disclosure.

What is claimed is:

1. A seat for a vehicle, comprising:
a fixed rail mounted on a floor panel;
a seat cushion frame having a hinge bracket mounted on each side part thereof;
a slider mounted on a front side of the fixed rail to be fixed or moved back and forth;
a front link having a front end part connected to the slider through a first hinge and a rear end part connected to the hinge bracket through a second hinge;
a recliner base frame mounted on a rear side of the fixed rail to move back and forth;
a rear link having a front end part integrally formed on the hinge bracket and a rear end part connected to the recliner base frame through a third hinge; and
a seatback frame connected to an upper end part of the recliner base frame through a recliner.

2. The seat of claim 1, wherein a first moving rail is mounted on the front side of the fixed rail to be fixed or moved back and forth, and the slider is mounted on the first moving rail.

3. The seat of claim 1, wherein a second moving rail is mounted on the rear side of the fixed rail to move back and forth, and the recliner base frame is mounted on the second moving rail.

4. The seat of claim 1, wherein when the recliner base frame is moved forward by a distance of a maximum set range along the fixed rail with the slider fixed thereto, the rear link is rotated to stand up rearward around the third hinge, and the front link is rotated to stand up forward around the first hinge and the second hinge at the same time.

5. The seat of claim 4, wherein when the rear link is rotated to stand up rearward, and the front link is rotated to stand up forward at the same time, a walk-in function for rotating the seat cushion frame rearward to stand up is implemented.

6. The seat of claim 4, wherein when a seatback frame is reclined forward around the recliner, the seat cushion frame is also rotated rearward to stand up, thereby implementing a walk-in function with a wider passage space for boarding and alighting.

7. The seat of claim 1, wherein when the recliner base frame is moved forward by a distance of a minimum set range along the fixed rail with the slider fixed thereto, the rear link is rotated to be tilted rearward around the third hinge, and the front link is rotated to be tilted forward around the first hinge and the second hinge at the same time.

8. The seat of claim 7, wherein when the rear link is rotated to be tilted rearward, and the front link is rotated to be tilted forward at the same time, a tilting operation for causing a front end part of the seat cushion frame to ascend is performed, and a relaxation posture change function is implemented together by a reclining operation for reclining the seatback frame rearward around the recliner.

9. The seat of claim 1, wherein when the recliner base frame is moved rearward for a set distance along the fixed rail with the slider fixed thereto, the rear link is rotated downward around the third hinge, and the front link is rotated downward around the first hinge and the second hinge at the same time.

10. The seat of claim 9, wherein when the rear link is rotated downward, and the front link is rotated downward at the same time, a dive operation for causing a front end part of the seat cushion frame to descend is performed, and a seatback full-flat folding function is implemented together by a folding operation for folding the seatback frame forward around the recliner.

11. The seat of claim 1, wherein when the recliner base frame and the slider are moved forward or rearward along the fixed rail with the slider movably mounted thereto, back and forth positions of a whole seat are adjusted.

12. A seat for a vehicle, comprising:
a fixed rail mounted on a floor panel;
a seat cushion frame having a hinge bracket mounted on each side part thereof;
a moving rail mounted movably back and forth on the fixed rail;
a recliner base frame connected to a lower end part of a seatback frame by a recliner;
a guide frame extending from a front end part of the recliner base frame to be mounted on the moving rail, and provided with a structure in which a front guide hole and a rear guide hole are penetratingly formed;
a front link having a front end part on which a first guide pin to be inserted into the front guide hole of the guide frame is formed and a rear end part connected to the hinge bracket through a second hinge;
a rear link having a front end part integrally formed on the hinge bracket and a rear end part on which a second guide pin to be inserted into the rear guide hole of the guide frame is formed; and
a middle link having a front end part connected to a boundary surface between the front guide hole and the rear guide hole of the guide frame through a fourth hinge and a rear end part connected to the front end part of the rear link through a fifth hinge.

13. The seat of claim 12, wherein when the first guide pin of the front link is moved rearward by a maximum set distance along the front guide hole of the guide frame, and the second guide pin of the rear link is moved forward by the maximum set distance along the rear guide hole at the same time, the middle link is rotated to stand up forward around the fourth hinge and the fifth hinge.

14. The seat of claim 13, wherein when the middle link is rotated to stand up forward, a walk-in function for reclining a seatback frame forward around the recliner is implemented after have made the seat cushion frame stand up by rotating a front end part of the seat cushion frame rearward and simultaneously moving a rear end part of the seat cushion frame forward.

15. The seat of claim 12, wherein when the first guide pin of the front link is moved rearward by a minimum set distance along the front guide hole of the guide frame, and the second guide pin of the rear link is moved forward by the minimum set distance along the rear guide hole at the same time, the middle link is rotated to be tilted forward around the fourth hinge and the fifth hinge.

16. The seat of claim 15, wherein when the middle link is rotated to be tilted forward, a tilting operation for causing a front end part of the seat cushion frame to ascend and pulling a rear end part of the seat cushion frame forward at the same time is performed, and a relaxation posture change function is implemented together by a reclining operation for reclining the seatback frame rearward around the recliner.

17. The seat of claim 12, wherein when the first guide pin of the front link is moved to a front-most side of the front guide hole of the guide frame, and the second guide pin of the rear link is moved to a rear-most side of the rear guide hole at the same time, the middle link is rotated to be laid down around the fourth hinge and the fifth hinge.

18. The seat of claim 17, wherein when the middle link is rotated to be laid down, a dive operation for causing a front end part of the seat cushion frame to descend is performed, and a seatback full-flat folding function is implemented together by a folding operation for folding the seatback frame forward around the recliner.

\* \* \* \* \*